United States Patent
Smis et al.

(10) Patent No.: US 6,824,686 B2
(45) Date of Patent: Nov. 30, 2004

(54) METHOD FOR TREATING SOLID WASTE WITH AN ORGANIC FRACTION

(75) Inventors: Jan Smis, Melsen (BE); Philippe Vandevivere, Nairobi (KE); Luc De Baere, De Pinte (BE)

(73) Assignee: Organic Waste Systems, NV, Ghent (BE)

( * ) Notice: Subject to any disclaimer, the term of this patent is extended or adjusted under 35 U.S.C. 154(b) by 158 days.

(21) Appl. No.: 10/220,842

(22) PCT Filed: Mar. 6, 2001

(86) PCT No.: PCT/BE01/00037

§ 371 (c)(1), (2), (4) Date: Sep. 6, 2002

(87) PCT Pub. No.: WO01/66257

PCT Pub. Date: Sep. 13, 2001

(65) Prior Publication Data

US 2003/0024876 A1 Feb. 6, 2003

(30) Foreign Application Priority Data

Mar. 8, 2000 (BE) .......................................... 2000/0180

(51) Int. Cl.$^7$ ................................................. C02F 9/00
(52) U.S. Cl. ....................... 210/631; 210/689; 210/695; 210/767; 210/806; 241/21; 241/24.14; 241/24.15
(58) Field of Search ................................. 210/631, 609, 210/689, 695, 767, 806; 241/15, 21, 24.11, 24.14, 24.15, DIG. 38

(56) References Cited

U.S. PATENT DOCUMENTS

| | | | |
|---|---|---|---|
| 4,077,847 A | | 3/1978 | Choi et al. |
| 4,624,417 A | * | 11/1986 | Gangi .......................... 241/17 |
| 5,377,917 A | * | 1/1995 | Wiljan et al. .................. 241/14 |

FOREIGN PATENT DOCUMENTS

| | | |
|---|---|---|
| GB | 1 498 767 | 1/1978 |
| WO | WO 97/24186 | 7/1997 |

* cited by examiner

Primary Examiner—Robert A. Hopkins
(74) Attorney, Agent, or Firm—James Creighton Wray; Meera P. Narasimhan

(57) ABSTRACT

The present invention concerns a method for treating solid waste with an organic fraction. A slurry (4) of the waste (1) diluted with water (3) is sieved, at least by means of a sieving device (5) which lets pieces through whose dimension in at least one direction, and preferably in at least two standing directions, is situated between 2 and 20 mm, after which, from the slurry (7) which has passed through, a part of the ferrous metals (8) which are present in the waste (1) is removed from said waste by means of magnets, and the slurry (7) is finally dewatered.

27 Claims, 5 Drawing Sheets

METHOD FOR TREATING SOLID WASTE WITH AN ORGANIC FRACTION

This application claims the benefit of Belgian Application No. 2000/0180 filed Mar. 8, 2000 and PCT/BE01/00037 filed Mar. 6, 2001.

SUMMARY OF THE INVENTION

The present invention concerns a method for treating solid waste with an organic fraction, according to which method the waste is sieved while wet.

In the case of a selected collection of domestic waste, the organic fraction, provided it does not contain any major amounts of heavy metals, can be biologically treated into a high-grade compost.

The remaining residual waste, also called grey waste, still contains an amount of organic material and materials which can be recycled. This waste is burnt or dumped, which is relatively expensive and not environmentally friendly.

In some cases there is no selected collection of the domestic waste. This mixed domestic waste, which still contains a large fraction of organic material, is treated in the same manner as the above-mentioned residual waste.

Installations have been built to recycle the fractions of the above-mentioned residual waste and mixed waste which are suitable to be recycled. A thorough pre-selection was hereby carried out, followed by a biological treatment to obtain compost.

The major problem thereby is the quality of the end products, especially the presence of heavy metals, in particular in the compost.

Up to now, the selection has not been sufficient to produce large amounts of marketable end products with a stabilised organic fraction having a low proportion of heavy metals.

For several years, also dry selection of residual waste and mixed domestic waste has been applied by means of sieves, magnets erected above conveyor belts, air selectors, etc. The quality of the end products is such that they are not suitable for re-use or recycling. The dry selection techniques are so inefficient that in many countries, a separate collection of recyclable waste and biowaste has been introduced so as to obtain separate flows and so as to obtain products of an acceptable quality thanks to selection and treatment.

According to known methods for treating grey and mixed domestic waste or other solid waste with an organic fraction, the waste is biologically treated by making use of aerobic composting. The waste is stabilised and dried while being composted, after which ferrous metals and a fine sand fraction are recycled. The other major part of the dry substance of the waste has to be burnt, which is expensive.

Wet selection offers interesting prospects, in particular for residual waste, mixed waste with an organic fraction originating from domestic waste, and industrial waste which is comparable to domestic waste, which have been pre-selected in a conventional manner.

The removal of ferrous metals by means of magnets which are built in in waste conveyor devices or which hang over them, is restricted to large parts which are attracted by the magnets. A large number of smaller particles remains embedded in the waste.

Few devices for the treatment of solid domestic waste reduce the organic fraction to less than 20 mm, since the costs therefor rise fast with the degree of reduction.

Wet selection offers the possibility to loosen the particles from one another by adding large amounts of water, as a result of which the different components become accessible for selection.

However, the application of wet selection methods has been restricted up to now, as they usually produce strongly contaminated waste water, whose further treatment is expensive.

In aerobic composting installations, in which a solid substance content of about 50% is ideal, only a small amount of water can be added before an excess of waste water is produced which cannot be internally recycled in the composting device.

Methods whereby use is made of an anaerobic fermentation offer more possibilities for a wet selection, since said fermentation takes place in more humid circumstances than the aerobic composting, and an excess of waste water often cannot be avoided, so that a device for the water removal and the treatment of waste water is in any case required.

Anaerobic fermentation of waste can take place by means of dry fermentation, with over 15% dry substance in the reactor, as well as by means of wet fermentation with less than 15% dry substance in the reactor.

Methods whereby use is made of the wet fermentation for the treatment of waste which has been selected at the source, are designed to remove pollutants such as floating materials and heavy substances before the wet fermentation takes place, such that a fraction is obtained which is rich of organic material and poor of pollutants, as described for example in EP-A-0.520.172.

According to this last method, solid components are separated before the ferrous metals are separated from the dry waste by means of magnets and after water has been added, after which the residue is subjected to the wet fermentation.

A device which is suitable for the wet selection of heavy aggregates from mixed domestic waste or similar waste is described in EP-A-0.228.724. Stones, ceramic materials, batteries and heavy lumps, including some lumps of synthetic material, are separated by means of a separating tank filled with water, before the biological treatment takes place, so as to obtain a compost with few heavy components.

The treatment of mixed solid domestic waste may also include a wet pre-treatment into a pulp or a wet sieving, followed by a separation by a hydrocyclone.

According to such a known method, the waste with an organic fraction is pre-treated first in a dry selection device, where a combustible fraction, ferrous metals and other materials are recycled.

Mixed organic waste is separated by means of sieving, and after having been diluted with water, it is supplied to hydrocyclones, where the large inert components are separated.

The remaining fine organic material is separated by means of a sieve and then directed to a hydrocyclone again, where the sand fraction is removed. This last fraction is dewatered.

The rough organic fraction which is stopped by the above-mentioned sieve, is mixed with synthetic materials and other undesirable pieces which have already been separated and reduced in a crushing mill.

The remaining organic fraction is finally subjected to a fermentation.

As the separation takes place before the fermentation, the water is strongly contaminated, however, since all soluble components, such as organic fatty acids, sugars, etc. are present in the waste. Moreover, large quantities of water are required, and the separation is inefficient due to the heterogeneous character of the waste, which still contains the sticky and smelly organic substances which will have to be degraded in the subsequent fermentation or composting.

In fact, only sand is obtained as a recyclable material.

According to other known methods, the materials are separated after the fermentation or composting of the organic fraction. U.S. Pat. No. 4,079,837 describes a method for the recycling of recyclable materials after a fragmentation by means of thermal explosive decompression, followed by a biodegradation in a composting treatment. The fragmented and composted waste residue is separated into several fractions by means of conventional dry sieving and separation by air. Synthetic material is separated by means of floatation.

Fine sand, clay and other inert materials can be separated during the treatment after the hydrolysis in a two-phase fermentation as described in EP-A-0.142.873.

All the above-mentioned methods with wet treatments produce a compost of low quality and secondary materials, most of which contain too many heavy metals, especially if domestic residual waste or mixed waste is taken as a basis.

The positive effect of the biological treatment is often mainly restricted to the recycling of energy in the form of biogas and the production of a highly calorific fraction at the time of the dry selection during the pre-treatment.

SUMMARY OF THE INVENTION

The invention aims a method for the treatment of solid waste with an organic fraction which does not have the above-mentioned disadvantages and which makes it possible to obtain end products which do not contain large proportions of heavy metals.

This aim is reached according to the invention in that a slurry of the waste which has been diluted with water is sieved, at least by means of a sieving device which lets pieces through having a dimension in at least one direction, and preferably in at least two standing directions, which is situated between 2 and 20 mm, after which, from the slurry which has passed through, a part of the ferrous metals which are present in the waste is removed from said waste by means of magnets, and the slurry is finally dewatered.

It was found that the heavy metals usually adhere to ferrous metals, so that thanks to the removal of the latter, the concentration on the rest of the waste is reduced.

The diluted slurry can be produced in a separate stage which takes place just before the sieving or even during the sieving. However, the dilution into a slurry can also take place during a pre-treatment, for example during an anaerobic fermentation or hydrolysis when the dry substance content is low.

Preferably, waste is sieved which has been diluted into a slurry with a dry substance content of less than 10%.

Between the sieving and the removal of the ferrous metals, the above-mentioned slurry can be aerated.

After the removal of the ferrous metals, the sand can be removed from the slurry, for example by means of at least one hydrocyclone, and the fibrous material can be removed from it, for example by sieving with the help of at least one sieving device which lets pieces through whose dimension in at least one direction, and preferably in at least two standing directions, is smaller than 2 mm.

Preferably, after the separation of the ferrous metals, and after the water has been removed, the dewatered slurry is subjected to a biological treatment, in particular composting.

In order to better explain the characteristics of the invention, the following preferred embodiments of a method for the treatment of solid waste containing an organic fraction according to the invention are described as an example only without being limitative in any way, with reference to the accompanying drawings, in which:

DETAILED DESCRIPTION OF THE PREFERRED EMBODIMENTS

Figure 1:
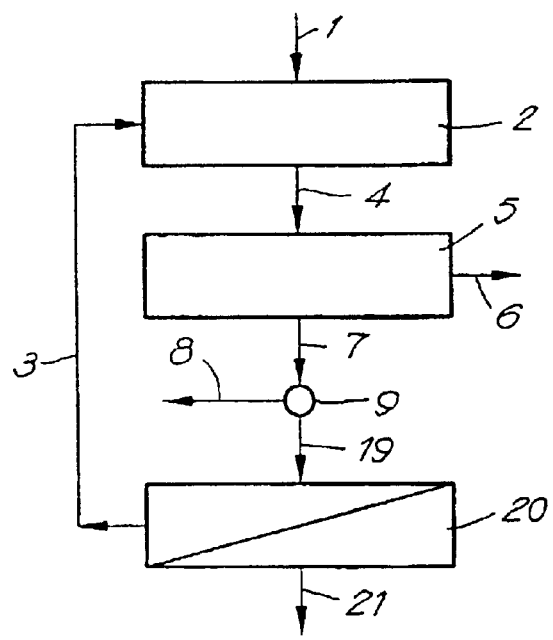
FIG. 1 represents a block diagram of a device for applying the method according to the invention.

For the treatment according to the invention of solid waste 1 containing an organic fraction, as represented in FIG. 1, a dilution with water 3 first takes place in a dilution device 2 until a slurry is obtained containing for example maximum 10 of dry substance.

The waste 1 to be treated may be the part containing organic material which has been obtained thanks to the dry selection of mixed domestic waste, industrial waste which is comparable to domestic waste or residual waste, or it may originate from a composting device or a fermentation device.

If the waste originates from an anaerobic fermentation or hydrolysis, the dilution can take place during this pre-treatment. The fermentation or hydrolysis can take place with less than 10% of dry substance. The dilution device then consists of the anaerobic fermentation tank or the hydrolysis tank.

The obtained slurry 4, in which the solid substance is strongly dispersed, is subsequently sieved in a sieving device 5 having such openings that pieces can go through it having a dimension in at least one direction, and preferably in at least two directions, which is situated between 2 and 20 mm. This sieving device 5 has for example round openings with a diameter of 20 mm or square openings with a side of 20 mm, but all sorts of shapes are possible of course.

If the slurry 4 contains clods, it is possible to provide a mechanical action during the dilution or sieving, for example a mechanical mixing or stirring, so that the clods break as a result of friction or such.

In order to speed up the sieving, one or several strong water jets can be directed onto the slurry 4, whereby these water jets press the slurry through the sieving device and can make the clods in the slurry disintegrate further.

It is even possible to obtain the dilution of the waste 1 by means of one or several water jets, such that the dilution and the sieving take place in one and the same direction, which is a combination of the dilution device 2 and the sieving device 5.

The rough fraction 6 is discharged for further treatment. From the fine slurry 7 which goes through the sieving device 5 and which contains particles of 20 mm at the most, the largest part of the ferrous metals 8 is separated in a subsequent stage by means of a magnetic treatment with one or several magnets 9.

To this end, the slurry 7 can be guided through a pipe in which a magnet 9, for example in the shape of a grid, is erected between two stop valves.

From time to time, the magnet 9 with the ferrous metals 8 adhering onto it, is taken out of the pipe. The ferrous metals 8 adhering to the magnet 9 are removed before the magnet 9 is put into place again.

Instead of being placed directly in the slurry 7, the magnet 9 can grasp over the pipe.

Both embodiments require the separation to be temporarily stopped so as to remove the ferrous metals 8.

Figure 2:
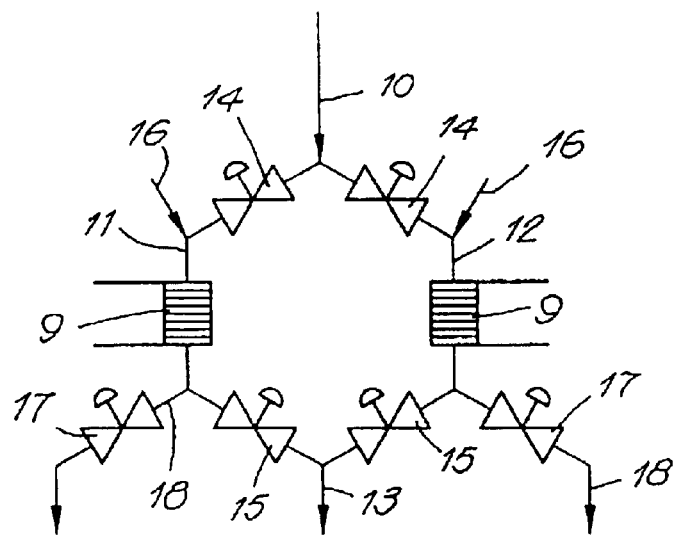
FIG. 2 represents the part of the device in which ferrous metals are separated by means of magnets into greater detail, but still schematically.

How it is possible to work continuously is illustrated in FIG. 2.

The slurry 7 is guided through an ingoing pipe 10 which branches off in two pipes 11 and 12 onto which are mounted removable magnets 9, for example electromagnets, which then join one another again in an outgoing pipe 13.

Upstream of the magnets 9 is provided a stop valve 14 in each pipe 11 and 12, whereas downstream of these magnets 9 is also erected a stop valve 15 in each pipe 11 and 12.

Between each stop valve 14 and the magnet 9 is connected a water supply line 16 onto each pipe 11 and 12, whereas downstream of each stop valve 15 is connected a discharge pipe 18 for ferrous metals 8 which can be closed off by a stop valve 17.

During the normal operation, the stop valves 14 and 15 are open in either one of the pipes 11 or 12, for example the pipe 11. The other stop valves 14 and 15 and the stop valves 17 are closed, and no water is supplied via the water supply lines 16.

Ferrous metals 8 found in the slurry 7 are retained in the pipe 11 which is in use by means of the magnet 9 which is situated in the immediate vicinity of the slurry 7.

After a certain length of time, the stop valves 14 and 15 in the other pipe 12 are opened, whereas the stop valves 14 and 15 in the pipe 11 are closed, and the stop valve 17 in the discharge pipe 18 connected onto it is opened. The magnet 9 is removed from the pipe 11, so that the ferrous metals 8 are no longer retained. By injecting water via the water supply lines 16, these ferrous metals 8 are discharged from the pipe 11, via the open stop valve 17 and the discharge pipe 18.

Then, the water supply is stopped and the above-mentioned stop valve 17 is closed again. The electromagnet 9 is put in its initial position again on the pipe 11.

In the meantime, ferrous metals 8 have been removed from the slurry 7 in the other pipe 12 by the other electromagnet 9.

The removal of the ferrous metals 8 from this pipe 12 takes place in the same manner as described above for pipe 11, but the stop valves 14 and 15 in this pipe 11 are first opened again, so that the ferrous metals 8 can now be separated again in the first pipe 11.

Thus, both pipes 11 and 12 are alternately used for the removal of the ferrous metals 8.

In all these embodiments, the slurry 19 from which the ferrous metals 8 have been removed in a magnetic manner, is discharged to a dewatering device 20, for example a centrifuge, in which they are dewatered. The separated water 3 with a solid substance content of less than 5% is recycled to the dilution device 2.

This dewatering can take place in two or several steps, whereby the last step is a mechanical dewatering and a preceding step is sedimentation or floatation, either or not with the addition of flocculation means.

The dewatered fraction 21 has a low concentration of heavy metals, since the latter are partly fixed on the ferrous metals 8 and have been retained together with the latter by the magnets 9. This fraction 21 can be dumped or for example composted.

Figure 3:
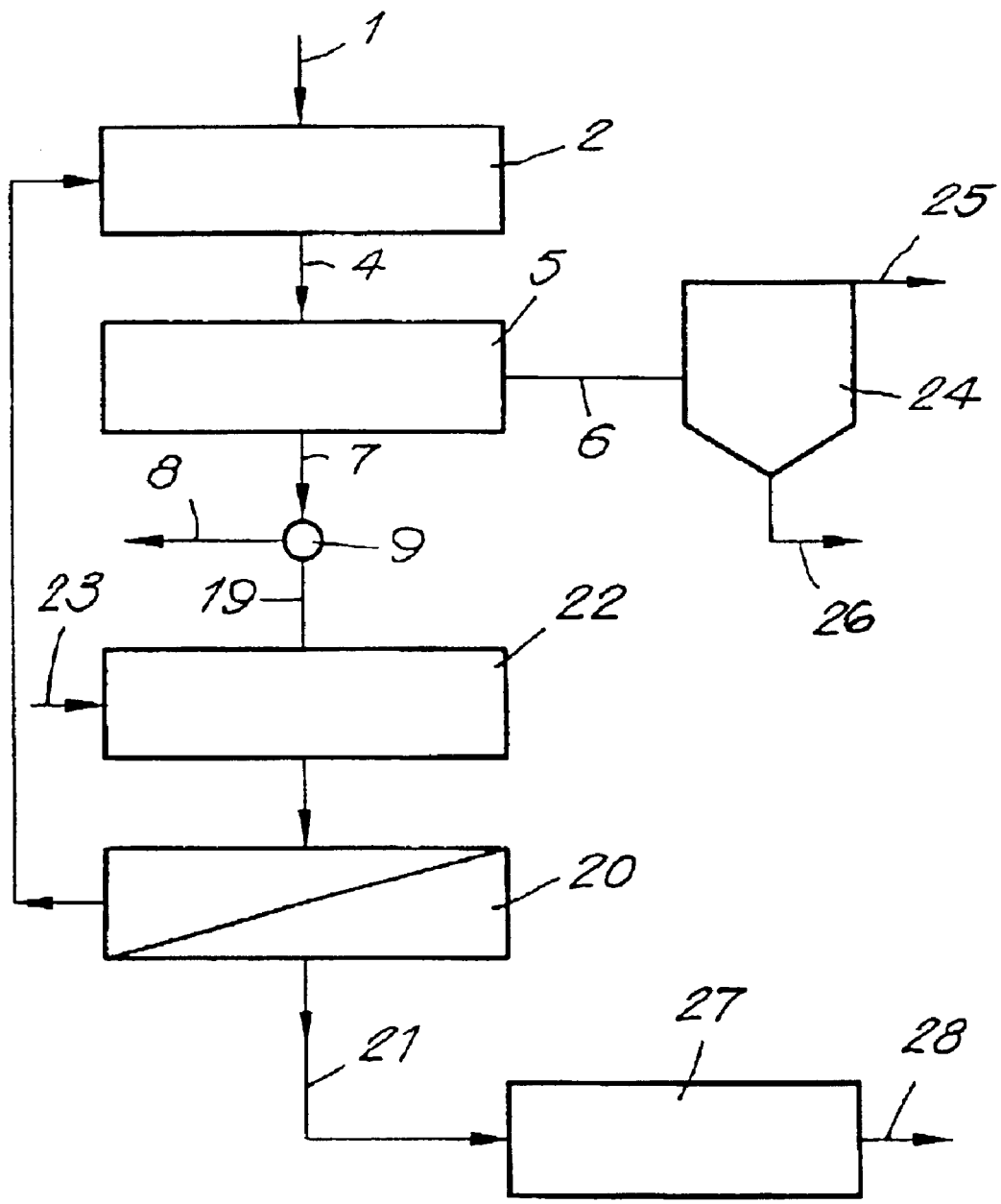
FIGS. 3 to 6 represent block diagrams analogous to the one in FIG. 1, of devices for the application of the method according to the invention, but with reference to other embodiments of the method.

Between the magnetic removal of the ferrous metals 8 and the dewatering, the slurry 19 can be subjected to an aerobic treatment or oxidation, for example it can be aerated in an aerator 22, in which air is blown in via a pipe 23, as represented in FIG. 3.

This embodiment further differs from the above-described embodiment in that the rough fraction 6 is guided from the sieving to a separation device 24, for example a sedimentation tank, where the fraction 25, consisting of the organic and woody fraction, as well as the synthetic fraction, is separated from the inert fraction 26.

The dewatered fraction 21 of the dewatering device 20 is biologically treated, for example in the composting device 27, where it is processed into compost 28.

Instead of a composting device, a fermentation tank can be used, provided the waste 1 has not been fermented yet in an anaerobic manner.

The removal of the ferrous metals 8 in the above-described manner may be sufficient for some applications, but for most waste with an organic fraction, the proportion of heavy metals in the obtained end fractions remains too large.

Figure 4:
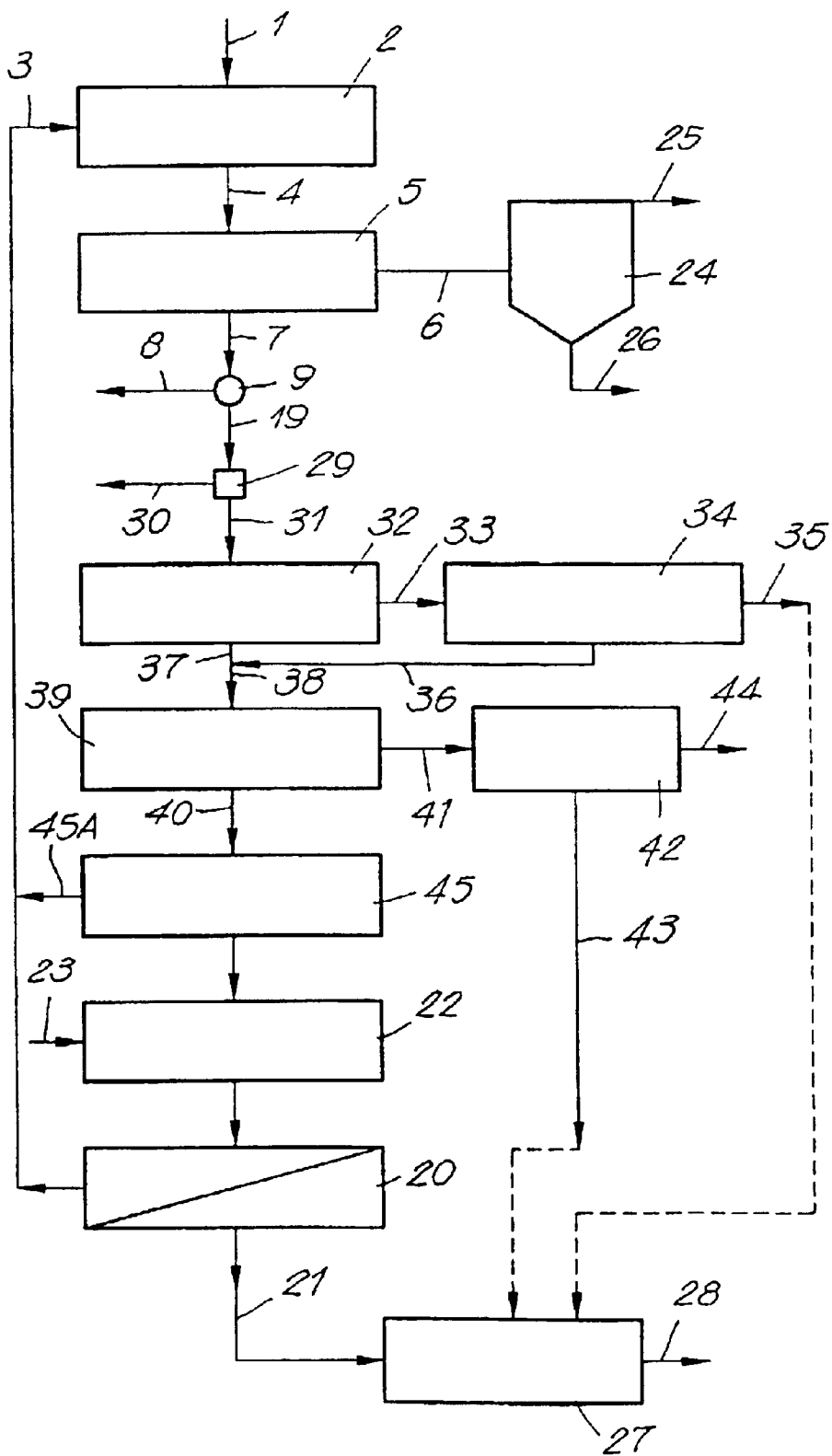

In order to avoid this, one proceeds as will be illustrated by means of the device represented in FIG. 4. This device differs from the device according to FIG. 3 in that, between the magnetic separation of the ferrous metals and the aerator 22, or the dewatering device 20 if this aerator 22 is omitted, the following other devices are present.

After the magnet 9 is erected a separator 29 working on the basis of rotational flows in which the non-ferrous metals 30 are separated from the slurry 19.

Next is erected a sand separator 32, for example a hydrocyclone, in which a sand fraction 33 is separated from the remaining slurry 31. From this sand fraction 33 can be removed remaining organic components and other undesirable components in a second sand separator 34, for example a second hydrocyclone, in order to reduce the proportion of solid organic components, so that a rather pure and re-usable sand fraction 35 is obtained.

The organic slurry 36 which is separated in this second sand separator 34 is combined with the slurry 37, which is also rich of organic components, originating from the sand separator 32, and the resulting slurry 38 is then finely sieved in the sieving device 39 with openings which can let particles through whose dimension, at least in one direction, and preferably in at least two standing directions, is smaller than or equal to 2 mm. This sieving device 39 has for example round openings with a diameter of 2 mm or square openings with a side of 2 mm.

Thanks to the sieving device 39 is obtained a fine slurry 40 on the one hand, and a fibrous fraction 41 on the other hand. The latter fraction is supplied to a third sieving device 42, for example a basket sieve or a rotating sieve, in which the fibres 43 having a low concentration of heavy metals are separated from a fraction 44 containing the synthetic materials, metals and pollutants bond with them, and other undesirable materials, such by means of sieving.

This third sieving device 42 only lets particles through of which at least one dimension is smaller than 500 micrometer, and it has for example round openings with a diameter smaller than 500 micrometer or square openings with a side smaller than 500 micrometer. In this case, the above-mentioned dimension of the openings of the first sieving device 5 is preferably smaller than 5 mm and the dimension of the second sieving device 39 is smaller than 1 mm.

The fine slurry 40, having a particle size of less than 2 mm, containing the largest part of the remaining heavy metals which did not adhere to the ferrous metals 8 and which have not been separated by the separator 29, can be directly dewatered in the dewatering device 20 and, depending on the initial concentration of heavy metals and the standard requirements for the compost 28, can be composted in the composting device 27.

Onto this composting device can be added the sand fraction 33, or preferably the sand fraction 35 and/or the fibrous fraction 41, or preferably the fibres 43, as is represented by the dashed line in FIG. 4. From these fractions or fibres can possibly also be removed small amounts of remaining heavy metals in a chemical manner, for example by means of a chelator.

The fibres 43 offer the structure material which is required for the aerobic treatment, whereas the slurry 40 supplies the nitrogen which is necessary for the biological activity.

The compost 28 is a good compost which is relatively free of pollutants such as synthetic materials and glass.

As already mentioned, an aeration or in other words an oxidation of the slurry 40 can take place before the dewatering, for example for 0.1 to 72 hours. Onto the aerator 22 can be added oxidising agents. Said oxidation promotes the dewatering.

This aeration or oxidation can, as represented in FIG. 4, be preceded by a settling caused by the gravitational force or by sedimentation, and simultaneously by floatation in a sedimentation device 45, where the slurry 40 is thickened, so that less aeration and dewatering is required. The discharged water 45A is added to the water 3 for the dilution device 2.

When the above-described method was applied, the following results were obtained, represented in this table:

|  | A | B | C | D | E | F |
|---|---|---|---|---|---|---|
| Organic volatile substances (%) | 8 | 0.8 | 78 | 94.4 | 50 | 50 |
| Heavy metals (ppm on dry substance) | | | | | | |
| As | <5 | 1.8 | 2.6 | 1.6 | 6.1 | — |
| Cd | <0.5 | <0.5 | 0.8 | <0.5 | 1.5 | 1.4 |
| Cr | 60 | 48 | 52 | 21 | 136 | 36 |
| Cu | 100 | 93 | 74 | 29 | 190 | 80 |
| Hg | 0.1 | 0.8 | 1.1 | 0.7 | 2.8 | — |
| Pb | 55 | 119 | 91 | 27 | 225 | 90 |
| Ni | 16 | 26 | 25 | 10 | 63 | 18 |
| Zn | 310 | 190 | 480 | 170 | 824 | 250 |

Whereby

A is the sand fraction 33 after the sand separator 32,

B is the sand fraction 35 after the second sand separator 34,

C is the fibrous fraction 41 after the fine sieving in the sieve 39,

D are the fibres 43,

E is the dewatered fraction 21,

F is the slurry after an extra purification with a chelator.

Figure 5:
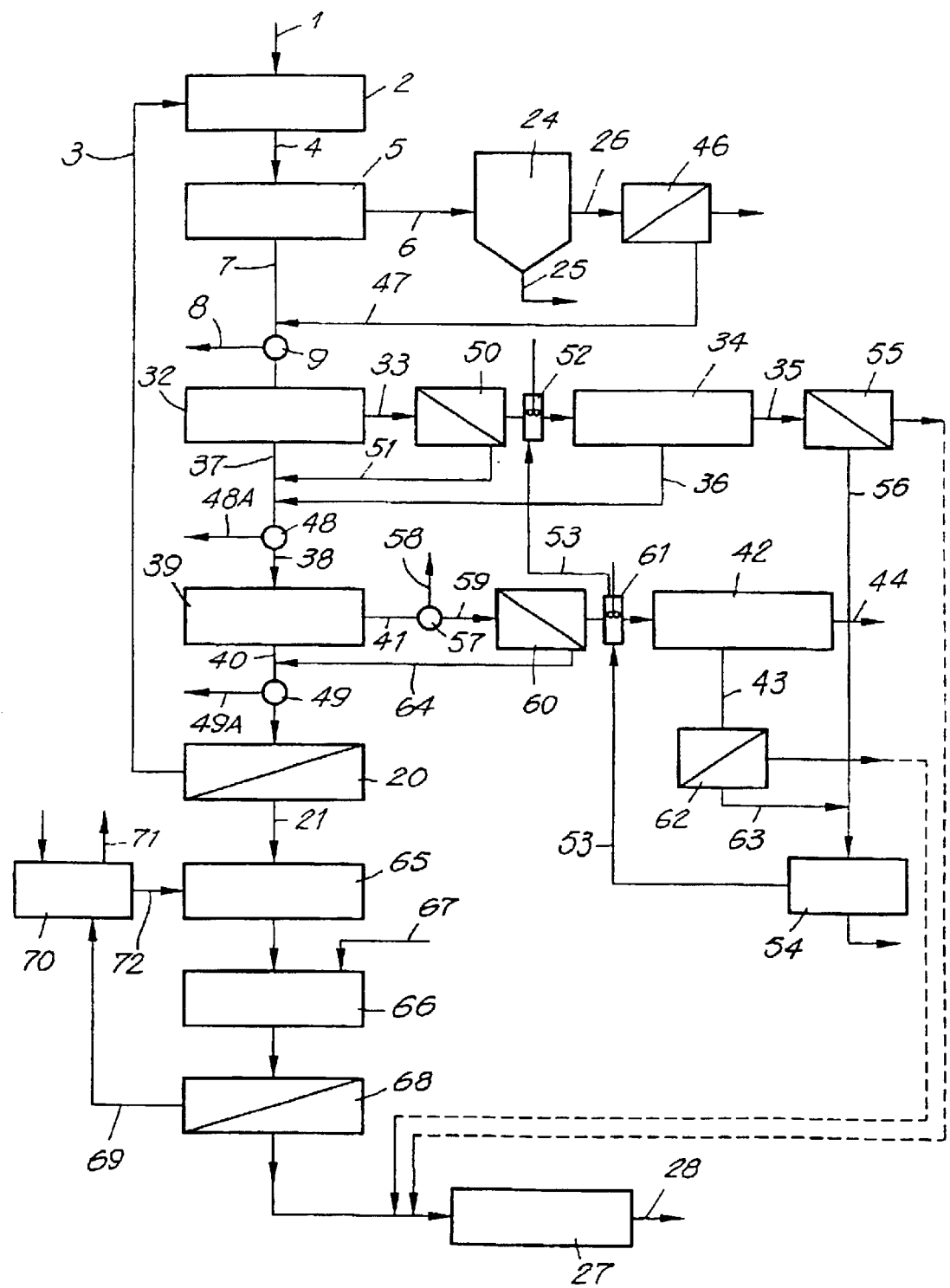

A compost of even better quality and a smaller water consumption can be obtained with the device represented in FIG. 5. In so far as this device corresponds to the one according to FIG. 4, identical fittings and flows have been indicated with the same reference figures.

The waste 1 is first diluted in the dilution device 2 and then sieved by the sieving device 5. The rough fraction 6 is separated in the separating device 24, for example a sedimentation tank, into a heavy fraction, namely the inert fraction 26 containing glass and stones and forming for example the sediment, and an organic, woody and synthetic fraction 25 which forms for example the floating fraction.

The latter is dewatered in a dewatering device 46. The separated water 47 is added to the slurry 7, before it undergoes the magnetic treatment.

There is for example no separation by means of a separator 29, although it would be possible, but both the slurry 38 of the sand separator 32 and the slurry 40 of the fine sieve are magnetically treated by means of a magnet 48, 49 respectively, similar to the above-described magnet 9.

Before or after each magnet 9, 48 and 49 can be erected a separator 29 working on the basis of rotational flows to remove the non-ferrous metals. For clarity's sake, such a separator 29 is only represented in FIG. 4.

Before the sand fraction 33 of the sand separator 32 is supplied to the second sand separator 34 in order to reduce the proportion of organic solid substances, it is first dewatered in a dewatering device 50, the water 51 of which is added to the slurry 37, and subsequently the solid sand fraction is mixed with water 53 originating from a physical/chemical water treatment in a tank 54 in a mixer 52.

Also after the second sand separator 34, the sand fraction 35 is dewatered in a dewatering device 55 of which the water 56 is collected in the tank 54. The organic slurry 36 of the second sand separator 34 is added to the organic slurry 37 of the sand separator 33, and together they are subjected to the treatment by the magnet 48 which separates some extra ferrous metals 48 A, before being finely sieved by the sieve 39.

According to a variant, the dewatering devices 50 and 55 can be replaced by sedimentation tanks, whereby the sediment is the sand fraction, or by other appropriate systems.

The fibrous fraction 41, before being sieved again in the sieving device 42, is magnetically treated as a slurry by a wet magnet 57, whereby an extra quantity of dispersed ferrous metal 58 is removed from it. The resulting slurry 59 is dewatered in the dewatering device 60 and mixed in a mixer 61 with water 53 coming from the tank 54.

The fibres 43 which have been separated from the synthetic materials, the metals bond with these and other products by means of the sieving device 42 or another separation device are dewatered in the dewatering device 62, of which the water 63 is collected in the tank 54 to be for example physicochemically treated.

Thanks to this water treatment in the tank 54 and the use of water from this tank 54 for separating sand in the second sand separator 34 and for diluting the fibrous fraction 41, the consumption of fresh water is minimised.

A possible excess of the water 3 which is sent from the dewatering device 20 to the dilution device 2 can also be treated in the tank 54. If there is too much treated and thus purified water, this can be discharged.

From the slurry 40 which has passed through the fine sieve 39, onto which the water 64 of the dewatering device 60 has been added, are removed the final fine rests of ferrous metals 49A with the magnet 49, after which the slurry is dewatered in the dewatering device 20.

Before the dewatered fraction 21 is sent to the composting device 27, possibly together with the purified and dewatered sand fraction 35 and the dewatered fibres 43, it can be mixed with a regenerated water solution 72 with active chelators, and it can be dispersed by means of mixing or friction in the device 65.

Afterwards, the fraction 21 can be further treated in a reactor 66, onto which are added chelators 67 which are preferably biodegradable, for example as described in EP-A-0.267.653, so as to solve an additional part of heavy metals which have not been removed together with the ferrous metals, and so as to remove them from the solid matter at the time of the dewatering in the dewatering device 68.

The metals 71 are separated from the water 69 of the dewatering device 68 in a regeneration unit 70. The regenerated water solution 72 is added to the device 65, and is thus re-used for the removal of the heavy metals in the reactor 66.

Figure 6:
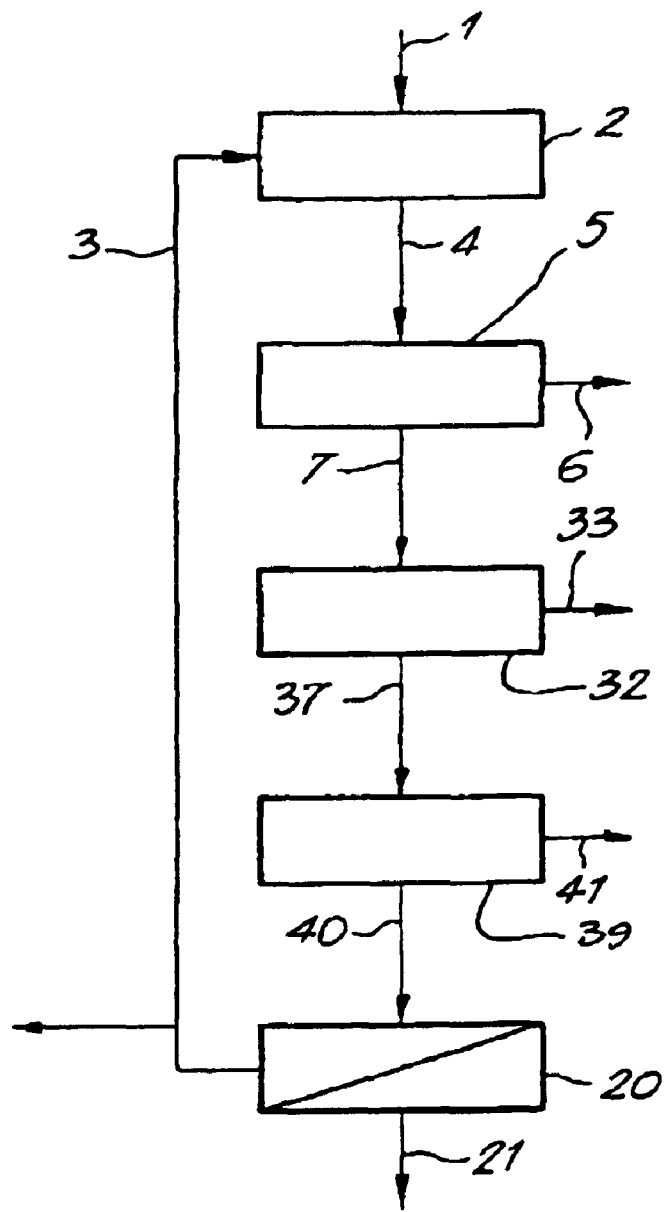

In the last described embodiments according to FIGS. 5 and 6, the use of fresh water is minimal and the costs for treating the excess of water for the treatments are limited.

The invention is by no means limited to the above-described embodiments represented in the accompanying drawings; on the contrary, such a method for the treatment of solid waste containing an organic fraction can be made in all sorts of variants while still remaining within the scope of the invention.

What is claimed is:

1. Method for treating solid waste with an organic fraction, comprising making a slurry by diluting waste with water, a first sieving of the slurry while wet, at least by means of a sieving device which lets pieces through having a dimension in at least one direction between 2 and 20 mm, in order to retain a rough fraction after which, from the slurry which has passed through, removing a sand fraction from the remaining slurry by at least one sand separator slier which, from the slurry which has passed through, removing a fibrous fraction by a second sieving with at least one sieving device having openings which can let through particles having a dimension smaller than or equal to 2 mm in at least one direction or optionally in at least two standing directions, and the slurry is dewatered and the water of the dewatering process is partially or entirely re-used for diluting the waste.

2. Method according to claim 1, wherein diluted slurry is produced in a separate stage which takes place right before the first sieving or during the first sieving itself.

3. Method according to claim 1, wherein the dilution into a slurry already takes place during a pre-treatment, optionally during an anaerobic fermentation or hydrolysis when dry substance content is low.

4. Method according to claim 1, wherein waste is sieved which has been diluted into a slurry with a dry substance content of less than 10%.

5. Method according to claim 1, wherein after the dewatering of the slurry, the obtained dewatered fraction is subjected to a biological treatment.

6. Method according to claim 1, wherein the rough fraction which is retained during the sieving by means of a sieving device is separated in a separation device, namely into an inert fraction and a fraction which is optionally dewatered in a water separator of which the water is added to the slurry again after the sieving.

7. Method according to claim 1, wherein, the non-ferrous metals are removed by means of a separator working on the basis of rotational flows.

8. Method according to claim 1, wherein before the dewatering the slurry is oxidized by means of aeration, oxygen injection or addition of other oxidizing agents.

9. Method according to claim 1, wherein the sand fraction is separated a second time from the organic slurry in a sand separator, whereby said organic slurry is preferably added to the slurry of the first sand separation.

10. Method according to claim 1, wherein the sand fraction is dewatered after the separation in the sand separator.

11. Method according to claim 9, wherein a dewatered sand fraction, after a first sand separation in the sand separator, is mixed with water originating from a dewatering of the sand fraction after the second sand separation in a sand separator, which water is optionally treated before a mixing, optionally in a physicochemical manner.

12. Method according to claim 1, wherein, before and/or after the first separation of the sand fraction and before or after the first separation of the fibrous fraction, there is separation of the ferrous metals from the slurry, in particular by means of magnets.

13. Method according to claim 1, wherein the separated fibrous fraction is dewatered, whereby the water thereof is preferably carried back to the slurry originating from the separation of the fibrous fraction.

14. Method according to claim 13, wherein dispersed remainders of ferrous metals are removed from the fibrous fraction, preferably by means of magnets.

15. Method according to claim 1, wherein the fibrous fraction is further separated into pure fibers and other substances, optionally by means of sieving in a sieving device.

16. Method according to claim 10, wherein the fibers are dewatered where the water is added to the water of the dewatering of the sand fraction.

17. Method according to claim 10, wherein, after the dewatering, a fibrous fraction is mixed with water coming from the dewatering of the sand fraction.

18. Method according to claim 1, wherein a biological treatment is added after the dewatering of the slurry.

19. Method according to claim 5, wherein a sand fraction is added to the dewatered fraction which is biologically treated.

20. Method according to claim 5, wherein a fibrous fraction or fibers are added to the dewatered fraction which is biologically treated.

21. Method according to claim 1, wherein the dewatered fraction, optionally a sand fraction and a fibrous fraction after the dewatering, is treated with a chelator.

22. Method according to claim 21, wherein, after the treatment with chelate, the slurry is dewatered again, and the water of this last dewatering is treated and added to the dewatered fraction again before the treatment with the chelator.

23. Method according to claim 1, wherein the slurry is first sieved with a sieving device which lets particles through of which at least one dimension is smaller than 5 mm and optionally at least two dimensions are smaller than 5 mm, that a fibrous fraction is removed by sieving with the help of at least one sieving device with openings which can let particles through whose dimension in at least one direction, and optionally in at least two standing directions, is smaller than 1 mm, and in that the fibrous fraction is further separated in pure fibers and other substances, optionally by means of sieving in a sieving device whose dimension in at least one direction, and optionally in at least two standing directions, is smaller than 500 micrometer.

24. Method according to claim 1, wherein the waste contains organic material obtained from mixed domestic waste, industrial waste which is comparable to domestic waste or residual waste, or waste originating from a composting device or fermentation device.

25. A method for treating solid waste with an organic fraction comprising making a slurry by diluting waste with water, sieving the slurry while wet at least by a sieving device which lets pieces through having a dimension in at least one direction between 2 and 20 mm, retaining a rough fraction after which, from the slurry which has passed through, removing a part of ferrous metals present in the waste by magnets, dewatering the slurry, recycling water from the dewatering process, and diluting the waste with the recycled water.

26. The method of claim 25, further comprising removing non-ferrous metals downstream from the removing of the ferrous metals.

27. The method of claim 26, wherein the removing non-ferrous metals comprises removing with a separator working on rotational flows.

* * * * *